Nov. 5, 1929.
B. C. STICKNEY
TYPEWRITING MACHINE
Re. 17,483
Original Filed July 1, 1925 2 Sheets-Sheet 1
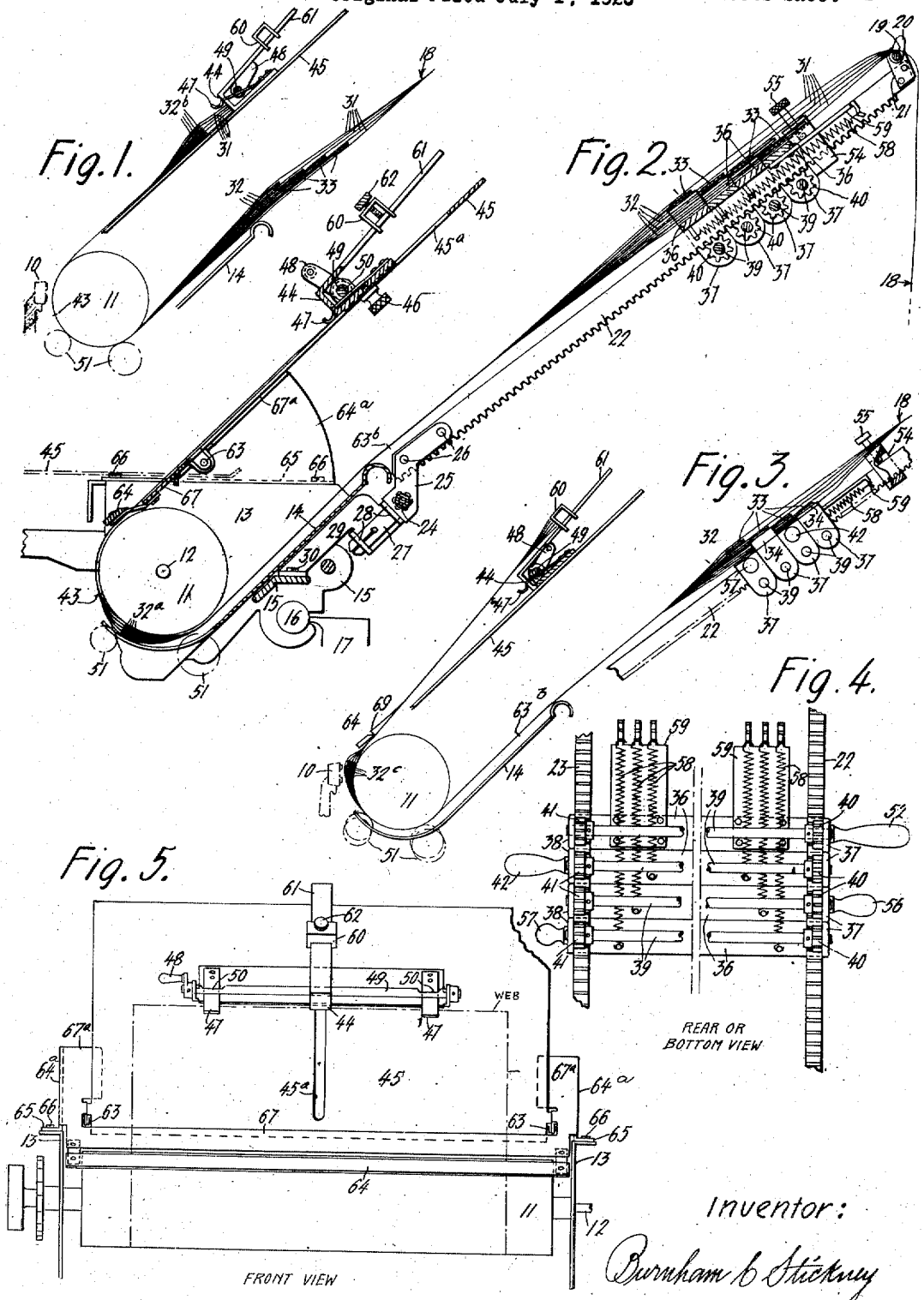
Inventor:
Burnham C. Stickney Nov. 5, 1929.

B. C. STICKNEY

TYPEWRITING MACHINE

Re. 17,483

Original Filed July 1, 1925

2 Sheets-Sheet 2

Inventor:

Burnham C. Stickney

Reissued Nov. 5, 1929

Re. 17,483

UNITED STATES PATENT OFFICE

BURNHAM C. STICKNEY, OF HILLSIDE, NEW JERSEY, ASSIGNOR TO UNDERWOOD ELLIOTT FISHER COMPANY, OF NEW YORK, N. Y., A CORPORATION OF DELAWARE

TYPEWRITING MACHINE

Original No. 1,679,951, dated August 7, 1928, Serial No. 40,741, filed July 1, 1925. Application for reissue filed August 9, 1928. Serial No. 298,587.

This invention relates to front-strike typewriting machines equipped for typing upon multiple-ply webs, the same being either fan-folded or consisting of loose plies.

These plies are usually interleaved with sheets of carbon, which are usually long enough to cover only one or two forms. The carbons are stripped from each form after it is typed, and shifted to the succeeding form on the web.

Where many copies are being manifolded, a difficulty arises in round-platen typewriters, when it is desired to strip the carbons from the typed form to the fresh form on the web, because the carbons stick to the plies of web where they bend around the platen, a snubbing action taking place, that is, the carbons having the effect of one binding upon another as it is attempted to pull them all back around the under side of the platen, as by pushing back the carrier to which all the carbons are attached at their rear ends. The carbons are difficult to strip or shift, and are apt to become torn. To avoid this difficulty, it has been the practice to displace the platen upwardly to permit the composite web to be straightened out, so that the carbon-carrier can strip the carbons easily back to their new positions; whereupon the platen has been depressed to typing position. This makes necessary a substantial and expensive reconstruction of the typewriter-carriage and the platen-connections, and to provide expensive and bulky appurtenances.

An object of the invention is to avoid the delay and trouble that is usually experienced in round-platen typewriters of displacing the platen upwardly for this purpose, that is, to enable the carbons to be stripped successfully without displacing the platen, and in fact while the composite web remains looped around the platen, and to effect this result by means of simple, inexpensive devices which are readily attachable to a standard typewriting machine, thus avoiding the necessity of partially rebuilding the same.

An object of the invention is to provide an inexpensive, light device for stripping the carbons, of such a character that the stripping device and the web-presenting devices can be attached directly to the typewriting machine, or to the carriage thereof, with little or no alteration therein, and may be easily and rapidly manipulated.

It is one of the features of this invention to provide means for successfully stripping the carbons, as they stand looped around the platen, by pulling them back around the under side of the platen from the typed form to the succeeding form. To this end, each carbon is mounted upon an independently operable carrier. There are preferably as many carriers as there are carbons, and each carrier can move independently of all the others. It is within the scope of the invention, however, to attach two carbons to each independently movable carrier in some cases. After a form is typed, the outermost carbon may be stripped from the typed form to the next form, and therefore no longer binds upon the inner carbons. Said outer carbon strips easily and readily, because there is no carbon or sheet binding thereon. Then the next outer carbon may be stripped from the typed form to the succeeding form, and moves easily, because the outer carbon has been shifted back from around the platen. Then the third carbon may be shifted in like manner, and then the fourth, and so on; each carbon shifting readily because it is not bound by any other carbon.

It will thus be seen that the carbons may be stripped one after another, beginning with the free carbon until they are all stripped.

This overcomes the difficulty heretofore experienced of the binding of taut carbons upon one another as it was attempted to pull them around the platen. In the present invention there need be no binding and no difficulty.

If two adjacent carbons are attached to one carrier, they can in some cases be stripped successfully, because the binding of the outer upon the inner of the two carbons is not sufficient to prohibit the stripping operation.

According to the preferred form of practicing the present invention, when the composite web stands looped around the platen at the completion of the typing of a form, the leading end of the web may be clamped or fastened to the machine, preparatory to stripping the carbons. Thereupon the feed-rolls are cast off from the platen, thus releasing the web, and the outermost carbon is pulled back around the platen and retracted to position in register with the next form on the web. It will be understood that since no carbon surrounds said outermost carbon, there is nothing to bind upon it, or to hold it against the work-plies, and it will slip readily back around the platen. Then the next carbon (which has in its turn become the outermost one) is stripped back easily, since there is no exterior carbon-sheet to bind thereon. These carbons slip back to a point where their leading ends are under the platen, so that there is no loop, and no binding or snubbing effect of a stripped carbon upon the unstripped carbons. Moreover, the stripped carbons are not under tension, inasmuch as they are arrested by stops at the completion of the stripping operation. The stripping may proceed, stripping one carbon after another, until they are all stripped.

Then the leading end of the web may be advanced to bring the bottom edge of the just-typed form up to a web-severing knife; a severing gage being provided for the leading edge of the web.

Each stripper or carbon-carrier is preferably in the form of a transverse bar having at its ends bent-up ears; and in these ears there are journaled transverse horizontal rock-shafts, each rock-shaft carrying pinions at its ends. The pinions mesh with stationary racks, a pair of which extends upwardly and rearwardly from the rear end of the usual paper-table and carriage of the Underwood standard typewriter. Hence each stripper moves back and forth in parallelism.

The strippers may be moved by hand, and preferably they are provided with finger-pieces at alternate sides of the machine, so that the left hand may move the outer strip, and then the right hand may move the next, and the left hand the next, and the right and the next, and so on, so that the stripping may be readily effected.

Preferably the first stripper is connected by individual springs with each of the remaining strippers, all of these springs being tensioned at the operation of retracting the first stripper, and thereafter advancing or tending to advance the remaining strippers, so that in some cases the strippers will become self-retracting, so long as the first stripper is held back against its stop.

Other features and advantages will hereinafter appear.

In the accompanying drawings,

Figure 1 is a diagramatic sectional side elevation, illustrating the completion of the typing of a form, the leading end of the form having been advanced to a stripper-gage. In this and other views, the points of division between each printed form and the next are indicated by short dashes intersecting the web.

Figure 2 is a sectional central elevation on a larger scale, showing the leading end of the web as having been clamped, the feed-rolls released, and all of the carbon-strippers retracted.

Figure 3 is a view similar to Figures 1 and 2, but showing a later stage. At Figure 3 the web is shown as advanced to the web-severing gage, and the next form, with the interleaved carbons, is in position to begin typing thereon. At this figure the leading form is shown as being torn off by the knife.

Figure 4 is a rear or bottom view of the strippers and racks.

Figure 5 is a front view of the platen and platen-frame, with the delivery table, web-severing knife, etc., and showing the leading end of the first form set up against the stripping gage and under the clips, to hold the work-web fixed while the carbons are being stripped or shifted between the work-plies.

Figure 6:
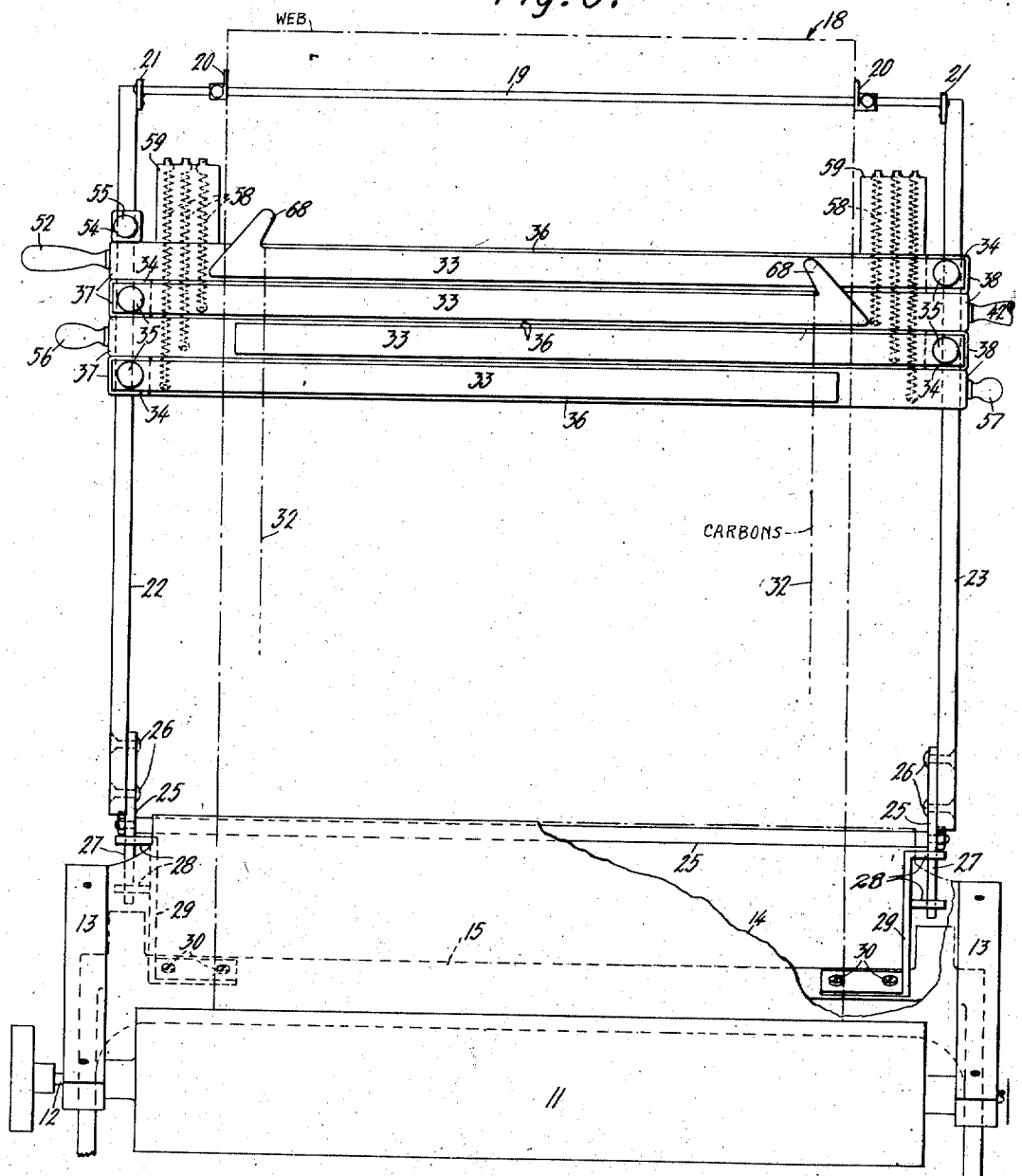

Figure 6 is a semi-perspective view, looking rearwardly and downwardly upon the platen and the stripping mechanism, showing the strippers in their retracted positions.

Figure 7:
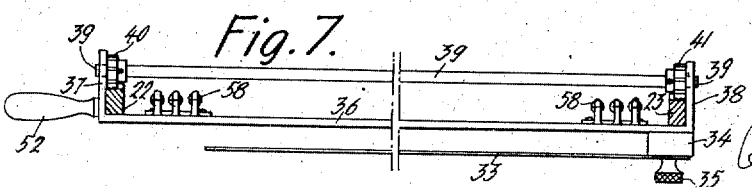

Figure 7 is a cross-sectional view corresponding to Figures 4 and 6, and showing the racks in section, also a stripper, with a pinion-shaft and carbon-blade. This view incidentally shows the stripper in inverted position, because it is placed below Figure 6; but it will be understood that if placed above Figure 6 it would appear with the carbon-blade at the top and the pinion-shaft at the bottom of the view.

In the Underwood standard typewriting machine, types 10 strike against the front side of a platen 11, which is journaled by means of an axle 12 in a platen-frame, which comprises ends 13 joined by a rear paper-shelf 14, which inclines downwardly and forwardly and curves under and up in front of the platen. This platen-frame is usually shiftable up and down upon a paper-carriage 15, which is guided upon tracks 16 supported on the framework of the machine 17.

A multiple-ply web 18, either fan-folded or consisting of loose plies, is led up from a source of supply, and passed forwardly over a guide-bar 19, between side guides 20, adjustable along said bar. The bar may be mounted by means of brackets 21 on the rear ends of two rack-bars 22, 23, which extend downwardly and forwardly to the paper-shelf 14. At their lower or front ends the rack-bars are connected by a transverse tie-rod 24; the parts 19, 21, 22, 24 and 25 forming a rigid frame. It will be seen that 25 consists of a pair of brackets which are riveted at 26 to the racks, respectively, which are hence rigidly joined by the tie-rod 24. This frame is shown without any table thereon, the table being preferably omitted to avoid overweighting the carriage; but it is obvious that a table may be supplied if desired.

This rack-frame is detachably mounted upon the typewriter-carriage. For this purpose split-pointed spring-studs 27 are inserted in sockets formed in ears 28 bent up from a bracket 29, which is secured by screws 30 upon the rear bar of the typewriter-carriage 15. In order to take the rack-frame off the machine, it is only necessary to pull the split spring-studs 27 out of the sockets. These spring-studs tend to open, and hence they bind in the sockets. Other means for detachably holding the rack-frame upon the typewriter may be provided.

Interleaved with the web-plies, which are indicated at 31, Figure 2, are carbon-sheets 32, the leading ends of which are shown at $32^a$, Figure 2, at $32^b$, Figure 1, and at $32^c$, Figure 3. The rear ends of the carbons are attached to blades 33 secured by usual dowel pins (not shown) upon heads 34, Figure 7, and are withdrawn from and replaced upon said heads by means of finger-pieces 35, in the usual way for the usual purpose of "loading" the carbons. The blades in section have an echelon relation at Figure 2, the outermost carbon being connected to the first or rearmost blade, the next carbon to the next blade, and so on, the innermost carbon being connected to the lowest blade, which is the nearest to the platen, and which is the last to be retracted.

The heads 34 are secured alternately upon opposite ends of carrier-bars 36, which extend horizontally from right to left, overlying the racks 22, 23, and having at their ends bent-down ears 37, 38, fitting over the racks, which serve as guides and supports or as tracks for these carbon-strippers. The ears 37, 38 are continued downwardly to form bearings for the ends of rock-shafts 39, which extend across the machine, each shaft having fixed upon its ends pinions 40, 41, the pinions 40 meshing with the rack 22, and the pinions 41 meshing with the rack 23. The rack and pinions make a compact, light structure, and are employed to insure that the individual movements of each carbon-stripper shall be in parallelism, and that it shall not bind or skew, even though the stripper is moved by means of its handle 42 at only one end thereof.

The strippers, in their retracted positions at Figure 2, lie one above another upon the racks or tracks, and the carbons extend downwardly and forwardly therefrom, each carbon being usually about the length of two typed forms, and terminating at $32^a$.

At the completion of the form-typing operation, the lower end of the first form stands a little below the printing line, and at the point marked 43, Figure 1; and the composite web of work-plies and carbons stands looped around the platen. The leading ends of the web are set up against a gage 44, which may be adjusted up and down upon and along a rearwardly-inclined work-shelf 45, having a slot $45^a$ for this purpose, and mounted at the delivery side of the platen 11. This gage is secured where adjusted by a thumb-screw 46. Upon the gage is provided a pair of clips 47, which may be forced down to clamping position by means of a handle 48. This handle is shown in released position at Figure 1, and in clamping position at Figure 2. It is fixed upon a rock-shaft 49, having a flat 50, which, when the handle is depressed, permits the spring-clips 47 to rise and free the work-web.

When the typing of a form is completed, as at Figure 1, the handle 48 is raised, Figure 2, to cause the rock-shaft 49 to force down the clips 47 upon the front corners of the leading end of the web, thereby holding the same stationary during the carbon-stripping operation. The next step is to release the feed-rolls 51, which usually run upon the bottom of the platen, to relieve the carbons of pressure.

Then the outermost of the carbons, that is the one most remote from the platen, and located outside of all other carbons, is pulled rearwardly by grasping handle 52 of its stripper 36, and the outer carbon is thereby readily retracted; the pinions 40, 41 keeping the moving carbon-carrier in parallelism, or preventing it from skewing or binding, and the rack-bars 22, 23 also guiding the stripper in its upward movement. At this time the leading edge of the stripped outer carbon reaches the retracted position seen at $32^a$, Figure 2, which is just under the bottom of the platen, so that this outer retracted carbon has no purchase to bind upon or snub the inner unretracted carbons. Moreover, said carbon-carrier 36 is arrested by a stop 54, and hence there is no pull upon the carbon, and consequently no binding thereof upon the inner carbons, which still remain unretracted. The stop 54 may be adjusted backwardly and forwardly along the rack 22, and secured by a clamping screw 55, to accommodate different lengths of carbons and forms. The next carbon-holder 36 may be thrust backwardly by means of its handle 42, thus stripping the second carbon from the typed form, as this is now the outermost carbon, so far as the platen is concerned; and this carbon-stripper or carrier may be thrust backwardly and upwardly against the first retracted cabon-carrier 36. Then the next carbon is retracted by means of a handle 56 upon its carrier, and then the fourth carbon by means of a handle 57 on its carrier. It will be seen at Figure 4 that these handles are alternately at opposite sides of the machine, permitting the use of the right and left hands alternately, thus saving time and labor in stripping the carbons.

If desired, adjustable tension-springs 58 may be secured at their rear ends to brackets 59 upon the rearmost carbon-carrier, and individually connected at their forward ends to the several remaining carbon-carriers 36. These springs may be tensioned by the backward pressure of the thumb upon the finger-piece 52, when retracting the first carbon-carrier. The springs which are connected to the next carbon-carrier will pull the same rearwardly. Thereupon both of the retracted carbon-carriers may be held back by means of finger-piece 42. The springs will then pull back the third carbon-carrier, and all three retracted carriers may be held back by finger-piece 56. Then the remaining springs will retract the remaining carbon-carrier. However, the springs may, if desired, be made much weaker, so as to have merely the effect of assisting in the pulling back of the carbon-carriers; that is, the springs may be made to co-operate with the fingers of the operator in effecting the retraction of the successive carbons. The springs may be adjusted to vary their strength as desired.

When the carbons are all retracted, their leading ends all stand at the position $32^a$, just under the platen at Figure 2. The leading web-form, whose lower end is indicated at 43, is then advanced by pulling the same up by means of its leading end, after the clips 47 have been released by pulling down the handle 48. Then said leading end of the typed form is lifted out from under the clips and advanced by hand against a gage 60, which is adjustable along a staff 61 extending backwardly from the top of the gage 44, the gage 60 being secured by a thumb-screw 62. At Figure 3 the leading end of the typed form is shown as adjusted to this gage 60, thus bringing the succeeding form (whose bottom end is indicated at $63^b$, Figure 3) to position to receive the first line of typing, the carbons at $32^c$, Figure 3, being now just above the printing line. Before beginning the typing of this second form, the first form may be torn off, by the aid of knife 64 as seen at 69, Figure 3. The feed-rolls 51 may be then restored from their released positions to their effective positions, as seen at Figure 3, and the typing of the second form may proceed.

It will be understood that the rack-frame may be detached by pulling out the studs from the sockets, and together with the strippers thereon and the composite web, said rack-frame may be temporarily laid aside, while another rack-frame having its own set of carbon-carriers through which another web is threaded may be attached to the machine by inserting the studs in the sockets. Thus the machine is readily adapted to perform work upon different composite webs selectively, without disconnecting any web from the carbon-carriers through which it is threaded, thereby meeting a well-known requirement in this art.

The delivery work-shelf 45 can be swung forwardly and downwardly upon a hinge at 63, thereby forming a convenient table, and also giving convenient access to the leading end of the work-web when it is desired to "load" the carbons or insert the blades with their attached carbons between the plies of web. The blades may thereupon be attached to the carbon-carrier heads by inserting the usual dowels in the usual sockets. This work-shelf 45 is hinged to a frame which includes standards $64^a$ having flanges or feet 65 detachably mounted by screws 66 upon said platen-frame, and also including an inclined plate 67, to which the knife 64 is attached, and supporting flanges $67^a$. The folds of the webs may be split by blades 68 on the ends of the carbon-strippers.

It will be noted that one feature of the invention is the provision of a compact stripper for effecting the necessary shifting between the web-plies and the carbon in line-space direction. There is illustrated the novel compact stripper to form one of a set of independently-movable strippers or carriers, and their compactness may conduce to economy of carbon, since the excess in length of the longest carbon over the shortest is not very much, inasmuch as the distance from the top stripper to the bottom stripper (Figure 6) is kept at a minimum by the use of the compact strippers. The compact stripper is not limited to this use, however, and it will be seen that the stripper has the form of a sheet-carrier and that it is rendered compact by forming it in the shape of a cross-beam which extends horizontally from one track, at one side of the web, to the other track at the other side of the web, and has bearings upon both tracks, while the cross-beam, bar, or truck 36 depends upon its pinions 40 and shaft 39 to maintain it in parallelism with the platen by co-operation with stationary racks 22, with which the pinions mesh. The pinions, which occupy little space, travel with the truck, while the racks, which are very long, remain stationary or non-traveling.

The relative stripping movement is effected between the plies of work-web and the interleaved carbon with the platen in normal printing position (the moving member being pulled around the platen at the stripping operation), the stripping means including the releasable clip 47, which is outside of the carbon-field, for clamping the work-webs together for stripping.

Variations may be resorted to within the scope of the invention, and portions of the improvements may be used without others.

Having thus described my invention, I claim:

1. In a web-manifolding typewriting machine, the combination with a platen and types of tracks extending rearwardly from the intake side of the platen, a set of carbon-strippers individual to the carbons and movable independently of one another along said tracks towards and away from the platen, and parallel motion mechanisms individual to said strippers and movable relatively to said tracks, for guiding said strippers in parallelism.

2. In a web-manifolding typewriting machine, the combination with a platen and types, of tracks extending rearwardly from the intake side of the platen, a set of carbon-strippers individual to the carbons and movable independently of one another along said tracks towards and away from the platen, each carbon-stripper including a slide and a carbon-blade, and means individual to each stripper for guiding the same in parallelism, said guiding means including a set of transverse rotative shafts having at their ends means to engage and control the ends of the strippers.

3. In a web-manifolding typewriting machine, the combination with a platen and types, of guideways extending rearwardly at the intake side of the platen beneath the work-web, a multiplicity of carbon-strippers, one for each carbon, mounted for movement independently of one another along said guideways, and a parallel motion mechanism individual to each stripper to move therewith for guiding the stripper in parallelism.

4. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, and means for retracting the strippers individually, beginning with the stripper for the outermost carbon and ending with the stripper for the innermost carbon, each stripper in the form of a bar extending lengthwise of the platen, and having at each end means for guiding it in parallelism.

5. In a web-manifolding typewriting machine, the combination with a platen over which the web is fed, of a set of carbon-strippers individual to the carbons at the intake side of the platen and movable independently of one another, releasable feed-rolls running upon the platen and co-operating therewith to advance the composite web, together with the strippers, during the typing of a form on the web, and means for retracting the strippers individually, beginning with the stripper for the outermost carbon and ending with the stripper for the innermost carbon, each of said strippers having an individual finger-piece for operating the same, said finger-pieces being alternately right and left on the successive strippers, and of graduated lengths.

6. In a web-manifolding typewriting machine, the combination with a platen over which the web is fed, of a set of carbon-strippers individual to the carbons at the intake side of the platen and movable independently of one another, each stripper in the form of a transverse bar having ears at its ends, a rock-shaft extending along said bar and journaled in said ears, pinions on the ends of said rock-shaft, and stationary racks with which the pinions mesh.

7. In a web-manifolding typewriting machine, the combination with a platen over which the web is fed, of a set of carbon-strippers individual to the carbons at the intake side of the platen and movable independently of one another, each stripper in the form of a transverse bar having ears at its ends, a rock-shaft extending along said bar and journaled in said ears, pinions on the ends of said rock-shaft, and stationary racks with which the pinions mesh, a pair of said racks extending upwardly and rearwardly at the rear of the platen.

8. In a web-manifolding typewriting machine, the combination with a platen over which the web is fed, of a set of carbon-strippers individual to the carbons at the intake side of the platen and movable independently of one another and retracting springs connected to certain of said strippers, said springs connecting the first or rearmost stripper with the remaining strippers.

9. The combination with a platen over which a web is fed and a supporting frame for the platen, of a pair of racks extending rearwardly at the intake side of the platen, a series of strippers movable independently of one another along said racks, and a shaft upon each stripper, each shaft having pinions to engage the racks to cause the stripper to move in parallelism.

10. The combination with a platen over which a web is fed and a supporting frame for the platen, of a pair of racks extending rearwardly at the intake side of the platen, a series of strippers movable independently of one another along said racks, a shaft upon each stripper, each shaft having pinions to engage the racks to cause the stripper to move in parallelism, and a guide-bar for the web connecting said racks at their rear ends.

11. The combination with a platen over which a web is fed and a supporting frame for the platen, of a pair of racks extending rearwardly at the intake side of the platen, a series of strippers movable independently of one another along said racks, a shaft upon each stripper, each shaft having pinions to engage the racks to cause the stripper to move in parallelism, a guide-bar for the web connecting said racks at their rear ends, and means at the forward ends of the racks to connect them detachably to the platen-supporting frame.

12. The combination with a platen over which a web is fed and a supporting frame for the platen, of a pair of racks extending rearwardly at the intake side of the platen, a series of strippers movable independently of one another along said racks, a shaft upon each stripper, each shaft having pinions to engage the racks to cause the stripper to move in parallelism, a guide-bar for the web connecting said racks at their rear ends, a transverse tie-rod connecting said racks at their forward ends, and forming with said racks and said tie-rod a rigid frame, a bracket detachably mounted upon the platen-supporting frame or carriage, and means detachably connecting said rack-frame to said bracket.

13. The combination with a platen over which a web is fed and a supporting frame for the platen, of a pair of racks extending rearwardly at the intake side of the platen, a series of strippers movable independently of one another along said racks, a shaft upon each stripper, each shaft having pinions to engage the racks to cause the stripper to move in parallelism, a guide-bar for the web connecting said racks at their rear ends, a transverse tie-rod connecting said racks at their forward ends, and forming with said racks and said tie-rod a rigid frame, a bracket detachably mounted upon the platen-supporting frame or carriage, and means detachably connecting said rack-frame to said bracket, said connecting means including a set of split studs and a set of socket-pieces in which the studs are introduced.

14. In a typewriting machine, the combination with a carriage and a revoluble platen thereon, of a frame detachably mounted upon said carriage and including a pair of separated racks, and individual carbon-strippers having pinions meshing with said racks and preventing skewing of the strippers.

15. In a web-manifolding machine, the combination with a revoluble platen and a carriage or support therefor, of a pair of rack-bars or rods extending rearwardly at the intake side of the platen, individual carbon-strippers each in the form of a cross-bar having a pair of bearings, a revoluble shaft fitted in each pair of bearings, and pinions fixed upon each shaft, in mesh with the racks.

16. In a web-manifolding machine, the combination with a revoluble platen and a carriage or support therefor, of a pair of rack-bars or rods extending rearwardly at the intake side of the platen, individual sliding carbon-strippers each in the form of a cross-bar having a pair of bearings, a carbon-blade supported at one end upon said bar, a revoluble shaft fitted in each pair of bearings, and pinions fixed upon each shaft, in mesh with the racks, said rack-bars serving as supporting guides for the sliding carbon-strippers.

17. In a web-manifolding machine, the combination with a revoluble platen and a carriage or support therefor, of a pair of rack-bars or rods extending rearwardly at the intake side of the platen, individual sliding carbon-strippers each in the form of a cross-bar having a pair of bearings, a revoluble shaft fitted in each pair of bearings, pinions fixed upon each shaft, in mesh with the racks, said rack-bars serving as supporting guides for the sliding carbon-strippers, an adjustable gage at the delivery side of the platen for the web at the stripping operation, and releasable clips connected to said gage to be adjusted therewith and effective to detain the web during the retraction of the carbons.

18. In a web-manifolding typewriting machine, the combination with a platen over which the web is fed, of a set of carbon-strippers individual to the carbons at the intake side of the platen and movable independently of one another, and retracting springs connected to certain of said strippers, said springs being individually adjustable.

19. In a web-manifolding machine, the combination with a revoluble platen and a carriage or support therefor, of a pair of rack-bars or rods extending rearwardly at the intake side of the platen, individual sliding carbon-strippers each in the form of a cross-bar having a pair of bearings, a revoluble shaft fitted in each pair of bearings, pinions fixed upon each shaft, in mesh with the racks, said rack-bars serving as supporting guides for the sliding carbon-strippers, an adjustable gage at the delivery side of the platen for the web at the stripping operation, releasable clips connected to said gage to be adjusted therewith and effective to detain the web during the retraction of the carbons, and a reading-edge gage connected to said adjustable stripping gage for setting the web to position to begin the typing of the first line on the next form.

20. In a web-manifolding machine, the combination with a revoluble platen and a carriage or support therefor, of a pair of rack-bars or rods extending rearwardly at the intake side of the platen, individual carbon-strippers each in the form of a cross-bar having a pair of bearings, a revoluble shaft fitted in each pair of bearings, pinions fixed upon each shaft, in mesh with the racks, said rack-bars serving as supporting guides for the carbon-strippers, an adjustable gage at the delivery side of the platen for the web at the stripping operation, releasable clips connected to said gage to be adjusted therewith and effective to detain the web during the retraction of the carbons, a leading-edge gage connected to said adjustable stripping gage for setting the web to position to begin the typing of the first line on the next form, and a severing knife in position to sever the web when positioned against said leading-edge gage.

21. In a web-manifolding machine, the combination with a revoluble platen and a carriage or support therefor, of a pair of rack-bars or rods extending rearwardly at the intake side of the platen, individual carbon-strippers each in the form of a cross-bar having a pair of bearings, a revoluble shaft fitted in each pair of bearings, pinions fixed upon each shaft, in mesh with the racks, said rack-bars serving as supporting guides for the carbon-strippers, an adjustable gage at the delivery side of the platen for the web at the stripping operation, releasable clips connected to said gage to be adjusted therewith and effective to detain the web during the retraction of the carbons, a leading-edge gage connected to said adjustable stripping gage for setting the web to position to begin the typing of the first line on the next form, and a severing knife in position to sever the web when positioned against said leading-edge gage, said leading-edge gage adjustable independently of the stripper-gage.

22. In a web-manifolding typewriting machine, the combination with a revoluble platen and a platen-frame or carriage, means upon which carbon-strippers are mounted for movement independently of each other downwardly and forwardly at the intake side of the platen, of a work-table at the delivery side of the platen and extending upwardly and rearwardly over said carbon-strippers, said work-table including a portion which is movable with respect to the platen out of the way to afford access to the web and carbons and the carbon-strippers at the intake side of the platen.

23. In a web-manifolding typewriting machine, the combination with a revoluble platen and a platen-frame or carriage, in which carbon-strippers are mounted for movement independently of each other at the intake side of the platen, of a work-table at the delivery side of the paten and extending upwardlv and rearwardly, said work-table including a portion which is hinged to be temporarily swung forwardly and downwardly to form a work-table for use when loading the carbons.

24. In a web-manifolding typewriting machine, the combination with a platen and types, of tracks extending rearwardly from the intake side of the platen, a set of carbon-strippers individual to the carbons and movable independently of one another along said tracks towards and away from the platen, and separate parallel motion mechanisms individual to each of said individual carbon-strippers for guiding each of them on the tracks in parallelism.

25. In a web-manifolding typewriting machine, the combination with a platen and types, of tracks extending rearwardly from the intake side of the platen, a set of carbon-strippers individual to the carbons and movable independently of one another along said tracks towards and away from the platen, each stripper in the form of a bar upon which an individual carbon-carrier is mounted, and means in the form of parallel motion mechanisms movable relatively to the stripper and relatively to the tracks for guiding the bars individually in parallelism, said means permitting that several bars to be moved into engagement with each other in series.

26. A web-manifolding attachment for a revoluble platen typewriting machine having a platen-frame, including a supporting frame extending tangentially of the platen upwardly and rearwardly therefrom, means for detachably mounting said supporting frame on the rear of said platen-frame, and a multiplicity of individually movable carbon-strippers mounted one behind another on said supporting frame, the rearmost stripper constructed to carry the outermost carbon, and the foremost stripper constructed to carry the innermost carbon.

27. In a front-strike typewriting machine, the combination with a platen and a letter-feeding platen-carriage, of means for effecting relative stripping movement between work-plies and a carbon while the plies and carbon are retained in the machine, including parallel tracks fixed upon said carriage and extending upwardly and rearwardly from the platen, a compact sheet-carrier in the form of a truck mounted for up-and-down movement upon said tracks, racks fixed upon said tracks, one rack for each of said tracks, said truck in the form of a cross-beam provided with end bearings that run upon said tracks, and a shaft upon said truck and having fixed thereon pinions meshing with said racks and traveling with said truck, one pinion for each rack, the truck being dependent upon said pinions to maintain it parallel with the platen.

28. In a front-strike typewriting machine, the combination with a platen and a platen-frame, of a stripping truck, stationary parallel tracks extending upwardly from the platen, said truck being in the compact form of a cross-beam guided at its ends upon said tracks for up-and-down movement, stationary racks upon said tracks, one rack upon each track, a shaft upon said truck and having connected pinions meshing with said racks, one pinion for each rack, said truck being dependent upon said pinions to keep it in parallelism with the platen, and means to restrain the truck against dropping.

29. In a front-strike typewriting machine, the combination with a platen and a platen-frame, of parallel side tracks extending away from the platen, a truck in the form of a cross-beam mounted upon said tracks for up-and-down movement thereon and extending across from one track to the other, and having bearings upon said tracks, stationary racks upon said tracks, one rack for each track, and a shaft upon said truck and having pinions meshing with said racks, one pinion for each rack, said truck being dependent upon said pinions, shaft and racks to keep it in parallelism with said platen.

30. In a front-strike typewriting machine, the combination with a platen and a platen-frame, of parallel racks extending upwardly and rearwardly away from the platen, a stripping truck in the form of a cross-beam having connected pinions thereon co-operative with said racks, one pinion for each rack, said truck being dependent upon said pinions to maintain it in parallelism with the platen, tracks for said truck, one rack for each track, means to restrain said truck against dropping, and sheet-holding means upon said truck.

31. The combination with a platen, of means for effecting relative stripping movement between a carbon and work-plies, including stationary parallel tracks having racks fixed thereon, one rack for each track, a compact stripper in the form of a truck mounted upon said tracks and having pinions thereon meshing with said racks, one pinion for each rack, said truck in the form of a cross-beam guided at its ends upon said tracks, means upon said truck to connect said pinions, said truck being dependent upon said pinions to maintain it parallel with the platen, and a handle upon said truck.

32. The combination with a front-strike typewriter platen, of means for effecting relative stripping movement between a carbon and work-plies, including parallel stationary tracks directed away from the platen upwardly and rearwardly, racks fixed upon said tracks, one rack for each track, a compact stripper in the form of a traveling cross-beam or truck mounted at its ends upon said tracks and movable therealong, connected pinions upon said beam, meshing with said racks, one pinion for each rack, said truck being dependent upon said pinions to maintain it parallel with the platen, and a handle upon an end of said truck.

33. The combination with a platen and a carriage, of means for effecting a relative stripping movement between the plies of a work-web and interleaved carbon with the platen in normal printing position, including a releasable clip outside of the carbon-field for clamping the webs together for stripping, a traveling truck in the form of a cross-beam carrying pinions at its ends and having a pinion-connecting shaft, racks in which said pinions run, one rack on each side of the work-web, parallel tracks whereby the cross-beam is guided by its ends along said racks, said racks being fast upon said tracks, one rack for each track, said truck being dependent upon said pinions to maintain it in parallelism with said platen, means for effecting stripping movement of said truck, and means securing the carbon for the stripping operation.

BURNHAM C. STICKNEY.